US 6,729,656 B2

(12) United States Patent
Kubert et al.

(10) Patent No.: US 6,729,656 B2
(45) Date of Patent: *May 4, 2004

(54) DEBIT CARD HAVING APPLIED PERSONAL IDENTIFICATION NUMBER (PIN) AND SCRATCH-OFF COATING AND METHOD OF FORMING SAME (75) Inventors: Vincent Kubert, Melbourne, FL (US); William Annacone, Stowe, VT (US)

(73) Assignee: T.S.D. LLC, Sebastian, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/075,115

(22) Filed: Feb. 13, 2002

(65) Prior Publication Data

US 2003/0151248 A1 Aug. 14, 2003

(51) Int. Cl.[7] ............................................. B42D 15/00
(52) U.S. Cl. .................... 283/100; 235/487; 235/493; 283/72; 283/901; 428/195; 428/915; 428/916
(58) Field of Search .......................... 283/67, 72, 74, 283/75, 100, 111, 901, 904; 428/195, 915, 916; 235/487, 491, 493

(56) References Cited

U.S. PATENT DOCUMENTS

| 4,536,218 | A |   | 8/1985  | Ganho ........................ 106/290 |
| 4,537,125 | A |   | 8/1985  | Gaucher .................... 101/93.04 |
| 4,707,594 | A | * | 11/1987 | Roth .......................... 235/488 |
| 4,726,608 | A |   | 2/1988  | Walton ........................ 283/96 |
| 4,738,473 | A |   | 4/1988  | Meloni et al. .............. 283/903 |
| 4,787,950 | A |   | 11/1988 | Meloni et al. .............. 156/249 |
| 4,850,618 | A |   | 7/1989  | Halladay, Jr. ................ 283/94 |
| 4,897,533 | A |   | 1/1990  | Lyszczarz ................... 235/487 |
| 5,037,101 | A |   | 8/1991  | McNulty .................... 273/139 |
| 5,228,692 | A | * | 7/1993  | Carrick et al. .............. 273/139 |
| 5,326,966 | A |   | 7/1994  | Fukuda et al. .............. 235/493 |
| 5,371,058 | A | * | 12/1994 | Wittig et al. ................ 503/206 |
| 5,481,970 | A |   | 1/1996  | Terzi et al. ................. 101/146 |
| 5,504,808 | A |   | 4/1996  | Hamrick, Jr. ............... 379/144 |
| 5,544,881 | A | * | 8/1996  | Rua et al. ................... 273/139 |
| 5,553,536 | A |   | 9/1996  | Van Os ........................ 101/44 |
| 5,558,021 | A |   | 9/1996  | Erhard et al. ............... 101/232 |
| 5,584,246 | A |   | 12/1996 | Steffen et al. .............. 101/485 |

(List continued on next page.)

FOREIGN PATENT DOCUMENTS

| CA | 1 190 987   |         | C09D/11/08 |
|----|-------------|---------|------------|
|    |             | 7/1985  |            |
| EP | 0 326 724   | 8/1989  |            |
| EP | 0 896 296   | 2/1999  |            |
| FR | 2 780 339   | 12/1999 |            |
| GB | 2 252 270 A | 8/1992  |            |
| WO | WO 97/43126 | 11/1997 |            |
| WO | WO 99/16566 | 4/1999  |            |

OTHER PUBLICATIONS

Patent Abstracts of Japan, vol. 1998, No. 13, Nov. 30, 1998, and JP 10 214320A (Dainippon Printing Co., Ltd,), Aug. 11, 1998, one page.
Patent Abstracts of Japan, vol. 1996, No. 11, Nov. 29, 1996, and JP 08 192593A (Dainippon Printing Co., Ltd.), Jul. 30, 1996, one page.

*Primary Examiner*—Monica S. Carter
(74) *Attorney, Agent, or Firm*—Allen, Dyer, Doppelt, Milbrath & Gilchrist, P.A.

(57) ABSTRACT

A method of forming a debit card and a debit card formed by the method are disclosed. A planar card member has opposing surfaces. A PIN is printed on one of the surfaces. The planar card member is advanced along a predetermined path of travel such as on a conveyor. A radiation cured, opaque scratch-off coating is applied onto the surface having the PIN such that the PIN is covered by the applied scratch-off coating. The scratch-off coating is radiation cured, preferably by ultraviolet radiation.

55 Claims, 5 Drawing Sheets

U.S. PATENT DOCUMENTS

| | | | |
|---|---|---|---|
| 5,601,887 A | | 2/1997 | Rich et al. .................... 428/29 |
| 5,605,738 A | * | 2/1997 | McGinness et al. ........ 428/195 |
| 5,629,977 A | | 5/1997 | Fonseca ..................... 379/144 |
| 5,635,702 A | | 6/1997 | Monicault .................. 235/492 |
| 5,640,447 A | | 6/1997 | Fonseca ..................... 379/144 |
| 5,651,316 A | | 7/1997 | DeMoore et al. ........ 101/450.1 |
| 5,673,309 A | | 9/1997 | Woynoski et al. .......... 379/144 |
| 5,685,220 A | | 11/1997 | Steffen et al. ................ 101/37 |
| 5,721,768 A | | 2/1998 | Stimson et al. ............ 379/114 |
| 5,918,909 A | | 7/1999 | Fiala et al. .................. 283/61 |
| 5,925,440 A | | 7/1999 | Farag et al. ................ 428/195 |
| 6,028,920 A | | 2/2000 | Carson ..................... 379/144 |
| 6,047,964 A | | 4/2000 | Lawandy et al. ........ 273/138.1 |
| 6,053,405 A | | 4/2000 | Irwin, Jr. et al. ........... 235/375 |
| 6,084,620 A | | 7/2000 | Morikawa et al. ............ 347/96 |
| 6,089,611 A | | 7/2000 | Blank ......................... 283/67 |
| 6,120,907 A | * | 9/2000 | Tahon et al. ................. 428/426 |
| 6,134,309 A | | 10/2000 | Carson ....................... 379/144 |
| 6,160,046 A | * | 12/2000 | Bleikolm et al. ........... 524/284 |
| 6,173,901 B1 | | 1/2001 | McCannel .................. 235/493 |
| 6,199,757 B1 | | 3/2001 | Kubert ....................... 235/380 |
| 6,349,829 B1 | * | 2/2002 | Matheis et al. ............. 206/449 |
| 6,370,240 B1 | * | 4/2002 | Woynoski et al. ..... 379/144.01 |
| 2001/0023895 A1 | | 9/2001 | Kubert et al. ................ 235/487 |
| 2001/0045742 A1 | | 11/2001 | Schulz ......................... 283/94 |
| 2001/0050311 A1 | | 12/2001 | Avellino ..................... 235/380 |
| 2002/0020739 A1 | | 2/2002 | Annacone et al. .......... 235/380 |
| 2002/0028321 A1 | | 3/2002 | Feilen, Sr. et al. .......... 428/201 |
| 2002/0033596 A1 | | 3/2002 | Katz .......................... 283/49 |
| 2002/0056959 A1 | | 5/2002 | Ference ..................... 271/112 |
| 2003/0173406 A1 | * | 9/2003 | Bi et al. ..................... 235/491 |
| 2003/0183695 A1 | * | 10/2003 | Labrec et al. ............... 235/487 |

* cited by examiner

DEBIT CARD HAVING APPLIED PERSONAL IDENTIFICATION NUMBER (PIN) AND SCRATCH-OFF COATING AND METHOD OF FORMING SAME

FIELD OF THE INVENTION

This invention relates to debit cards, such as telephone calling cards and credit cards, and more particularly, this invention relates to debit cards having personal identification numbers (PIN).

BACKGROUND OF THE INVENTION

Debit cards in the form of wallet sized phone cards have become commonplace in Europe, the United States, and Latin America because the purchaser of the phone card does not have to establish a special account with the phone company or other telephone service provider. As is well known, the phone card has a personal identification number (PIN) printed on the phone card. A scratch-off label, hot stamp foil, or other substantially opaque coating has typically been applied onto the PIN and covers the PIN. In the most simple type of debit card, the user purchases the card and scratches off this coating to reveal the PIN contained on the card. In the example of a phone card, the user dials a long distance telephone number belonging to the card issuer and dials the PIN contained on the card. The account balance is verified and a call to a desired location is completed by having the user dial a long distance telephone company. The phone card account balance is then charged.

In other types of debit cards, a magnetic strip can be applied onto the debit card to allow activation and/or replenishment of the debit card via a credit card or other means if insufficient funds are contained on the debit card. A control number often is established with the debit card to allow replenishing. As is the case with numerous debit cards, such as wallet sized phone cards, they must be processed in an automated manner very quickly. The PIN is typically printed on the debit card, together with a control number either adjacent to the PIN or located in another location on the surface of the debit card. One or two printing steps are required and a separate application step is required to cover the printed PIN with an opaque scratch-off coating. The applied materials, such as a label or hot stamp foil, are costly to apply and are a high cost consumable.

In one teaching as disclosed in commonly assigned U.S. Pat. No. 6,199,757, issued Mar. 13, 2001, to Profold, Inc. of Sebastian, Fla., the disclosure which is hereby incorporated by reference in its entirety, a scratch-off label strip is applied from a web contained on a supply reel during a labeling step. Although the scratch-off label is advantageously fed at high operating speeds during application of the scratch-off labels to about 20,000 to 30,000 cards per hour, a reel typically only holds about 15,000 scratch-off labels, and thus, some down time occurs when a reel must be changed. Also, web scrap is produced during this type of card production and must be discarded, sometimes adding to production loss and increasing labor and overall card costs.

SUMMARY OF THE INVENTION

It is therefore an object of the present invention to provide a debit card having a PIN and scratch-off coating that can be processed in an efficient manner that overcomes the prior art drawbacks as noted above.

It is another object of the present invention to provide a debit card that has a PIN and a cost saving scratch-off coating that has been efficiently applied in rapid card succession without error.

The present invention advantageously forms a debit card by advancing a planar card member along a predetermined path of travel. The card member has opposing surfaces and a PIN printed on one of the surfaces. A radiation cured and opaque scratch-off coating is applied onto to the surface of the card having the PIN such that the PIN is covered by the applied scratch-off coating. The scratch-off coating is preferably cured by ultraviolet radiation as a form of radiation curing, but could also be electron beam, blue light, laser or other radiation curing techniques known to those skilled in the art.

The opaque scratch-off coating is preferably applied by printing the opaque scratch-off coating. It should be understood that the application of the scratch-off coating is substrate dependent, and a transparent release coating could be applied first, followed by the opaque scratch-off coating, and in some instances, an ink jet layer as personalization. Depending on the substrate for the card, which could have a protective coating over printed indicia, a release coating may not be necessary. Although different printing processes can be used, including rotary letter press, offset (lithography), gravure, and rotary screen printing processes, in one aspect of the present invention, flexographic printing techniques are preferably used for printing the scratch-off coating by metering a scratch-off material from an Anilox metering roll onto an impression plate (print pad) of a plate cylinder mechanism and transferring the scratch-off material from the impression plate onto the surface of the planar card member.

In yet another aspect of the present invention, the opaque scratch-off coating can be applied by printing a substantially opaque ink layer, and printing another ink layer under or onto the first ink layer. The first substantially opaque printed ink layer could be an ultraviolet curable ink that is opaque after curing. The other ink layer could be printed by ink jet printing and could act as a fingerprint pattern as known to those skilled in the art.

In yet another aspect of the present invention, a security indicia is applied on the opaque scratch-off coating and could comprise a control code. The planar card member preferably comprises a substantially rigid plastic substrate, but could be other substrates typically used for debit cards, e.g., credit and telephone calling cards, including a paper substrate. The planar card member is substantially rectangular configured and wallet sized in one preferred aspect of the present invention.

In yet another aspect of the present invention, a transparent release coating is applied onto the surface of the planar card member over the PIN when the type of substrate demands such release coating. The opaque scratch-off coating is applied onto the release coating such that the PIN is covered by the opaque scratch-off coating and then radiation cured, such as by ultraviolet radiation. The release coating enhances removal of the scratch-off coating without damaging the PIN.

A debit card is also disclosed and includes a planar card member having opposing surfaces. A PIN (personal identification number) is applied onto the surface of the planar card member. An opaque scratch-off coating is formed from a preferred ultraviolet/radiation cured medium and applied over the PIN to hide the PIN from view such that upon removal of the scratch-off coating, the PIN is exposed to view for use of the debit card. This debit card could be a telephone calling card or credit card.

The opaque scratch-off coating could be a first substantially opaque printed ink layer and another printed ink layer, including an ink jet printed layer, positioned under or over the first printed layer. The printing process used by the present invention could include rotary letter press, offset, gravure, rotary screen or preferred flexographic methods. The planar card member is substantially rectangular configured and wallet sized and could include a release coating interposed between the PIN and opaque scratch-off coating for enhancing scratch-off of the scratch-off coating without damaging the PIN.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously overcomes the disadvantages of prior art debit calling cards, such as telephone calling cards, which use a scratch-off label or hot stamp foil that has been applied onto the surface of the debit card. The present invention prints a scratch-off coating and radiation cures the scratch-off coating, such as by ultraviolet radiation. Different printing methods can be used, including flexographic as a preferred printing method, or other printing processes using a rotary letter press, offset (lithography), gravure and rotary screen printing apparatus, using those printing techniques as known to those skilled in the art. In another aspect of the present invention, a release coating could be applied, depending on whether the substrate demands such coating, such as by printing over the PIN, which is followed by the printing on the release coating of the opaque scratch-off coating. A second printed layer, such as by flexographic printing or ink jet printing, could be printed under or over the first scratch-off coating layer and could be a fingerprint pattern.

Figure 1:
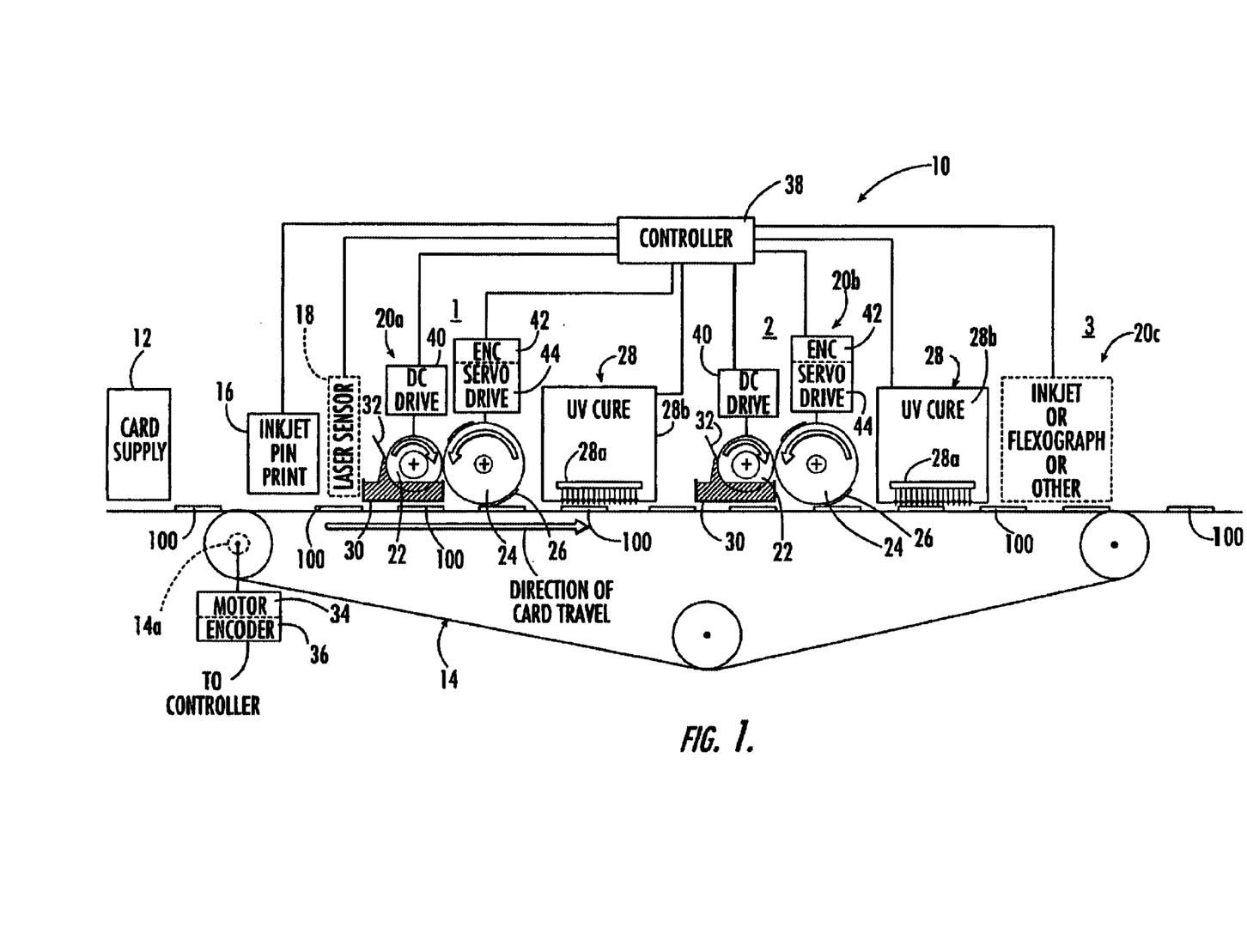
FIG. 1 is a block diagram of the system and apparatus used for producing the debit card of the present invention and showing basic components used in forming the debit card of the present invention.

Referring now to FIG. 1, there is illustrated at 10 a general block diagram of the system and apparatus that can be used for forming the debit card of the present invention. A card supply 12, such as a card hopper, stores planar card members that are to be advanced along a predetermined path of travel via a conveyor system 14, typically a belt conveyor having a vacuum draw mechanism for securing cards and other articles thereon. An example of such card supply 12 and conveyor system 14 could be the type disclosed in the incorporated by reference and commonly assigned U.S. Pat. No. 6,199,757 to Profold, Inc. of Sebastian, Fla. Naturally, the invention is not limited to such belt conveyor systems, and other card conveyance systems could be used as suggested by those skilled in the art.

Although different planar card members can be used for the purposes of the present invention, typical planar card members can be formed as a plastic substrate, including plastics such as polyvinyl chloride (PVC), acrylonitrile-butadiene-styrene (ABS), other styrene polymers, polyester (PET), and other materials commonly used for substrates in the credit card and telephone calling card industry. Typically, the substrate thickness varies from about 0.007 inches up to about 0.032 inches. Also, in other aspect of the present invention, common single ply, but somewhat thick and rigid paper, or multi-ply or other different paper substrates, could be used for the present invention.

As shown in FIG. 1, the system 10 includes a PIN print station 16 where personal identification numbers (PIN's) are printed on a surface of the debit card, such as by an ink jet printer or other print means. The print station 16 prints onto the surface of planar card members as they advance along a predetermined path of travel defined by the conveyor 14. It is possible that the card members could be printed with PIN's off-line, or in another location in an in-line position. The illustrated embodiment, however, shows the ink jet printing of PIN's occurring just before sensing of the cards by a laser sensor 18. Three print stations 20a, 20b and 20c are labeled 1, 2 and 3 and positioned adjacent the conveyor 14. The first two print stations 20a, 20b include a metering roll 22 in the form of an Anilox metering roll, a plate cylinder 24 having impression plates (print pads) 26 as commonly used in flexographic printing systems, and an ultraviolet curing station 28 in the form of an ultraviolet curing lamp. The third station 20c could be a similar station as stations 1 and 2, or could be an ink jet spray station or other printing station that applies a second and/or subsequent ink layers or other coatings over the opaque scratch-off coating.

After the PIN is printed onto the surface of the planar card member by PIN print station 16, the debit card is advanced in a predetermined path of travel by the belt conveyor where, in one aspect of the invention, a release coating is applied over the PIN. The release coating is typically less than about 2 mil thickness and preferably about 0.0002 to about 0.0005 inches thick and could range up to about 0.002 inches. The release coating is preferably transparent, but it does not have to be necessarily clear, but could be color tinted for aesthetic purposes. Typically, the release coating (if used) should be of a thickness and color such that the PIN can be seen through the release coating.

Figure 3:
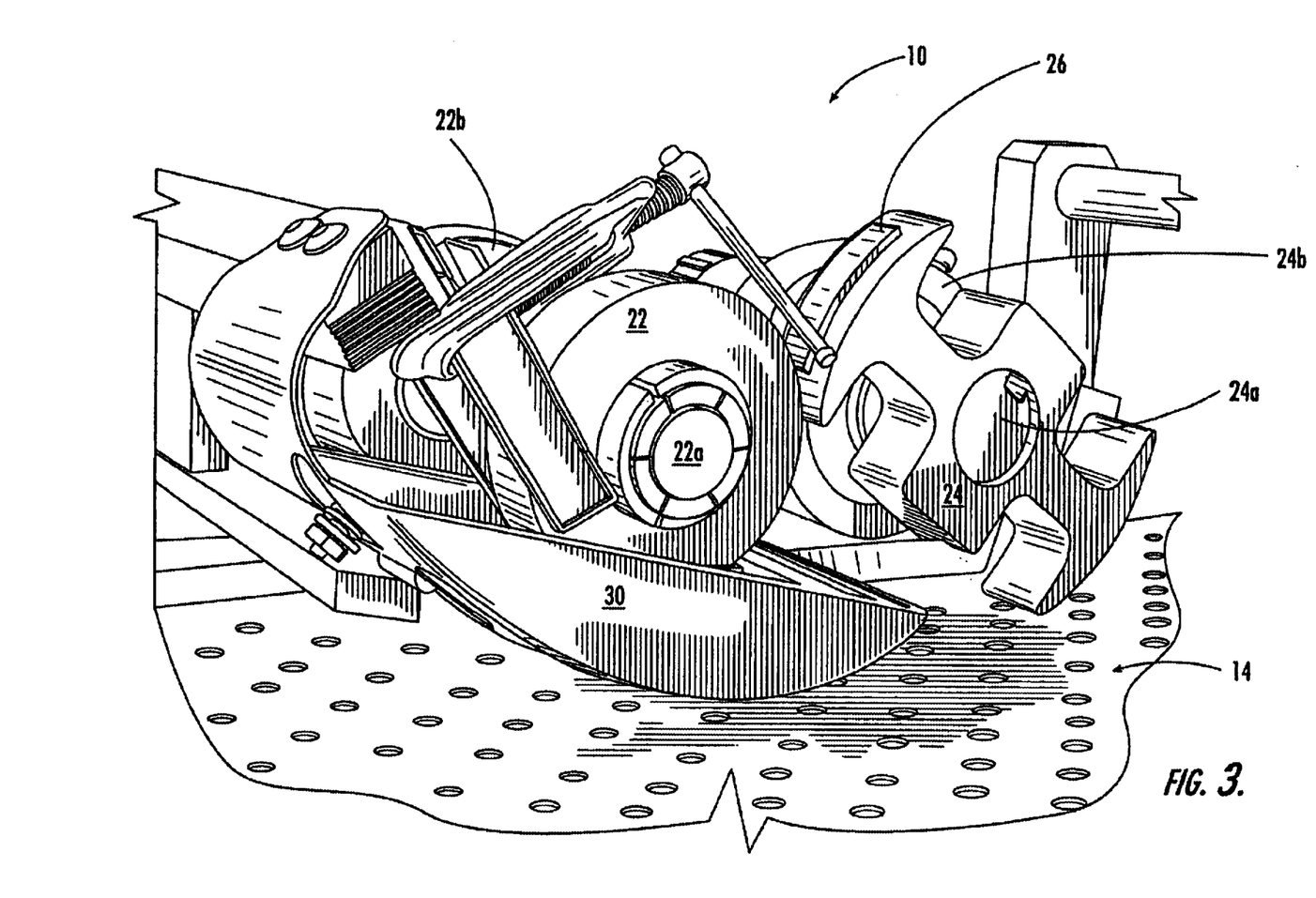
FIG. 3 is an enlarged isometric view of a print station having a metering roll, plate cylinder, and impression plate (print pad) used for transferring scratch-off material from the impression plate onto the surface of the planar card member that is advanced along a conveyor under the print station.

In a preferred aspect of the present invention, the release coating is applied by printing the release coating using a metering roll 22 and impression plate 26 in a flexographic printing process. Other printing methods that could be used include rotary letter press, offset (lithography), gravure, and rotary screen printing methods. The preferred printing method has been found to be the flexographic printing method, and includes an ink reservoir 30 in the form of an ink bath container, as shown in FIG. 3. The bath container 30 holds the ink in liquid form, which could be the release material or scratch-off material. The ink bath container could be a chambered doctor blade system or other enclosed doctor blade system. Although an open system is illustrated for purposes of description, a chambered doctor blade system would provide cleaner operation.

The Anilox metering roll 22, as known to those skilled in the art, is contained within the ink bath and includes the common knurled or other surface. A doctor blade 32 is operative with the metering roll 22 for engaging close to the metering roll and removing part of the liquid or ink in the form of the release material or scratch-off material from the Anilox metering roll.

The plate cylinder 24 has impression plates 26 in the form of print pads mounted thereon that engage the Anilox metering roll and transfers the release or scratch-off coating material from the plate (pads) onto the surface of the planar card member. The plate cylinder 24 is a generic term describing many types of flexographic design options. As shown in FIG. 3, the plate cylinder 24 can be formed similar to a bar bell configuration for saving weight by having less metal or other support structure that is rotated. The illustrated configuration allows two print pads 26. Other designs could support three or four print pads, essentially doubling throughput when four print pads are used. The impression plates (print pads) 26 can be formed of any type of material commonly known to those skilled in the art, including rubber print pads or photopolymer plates 26 and/or other flexible plate or pad material, typically known and used by those skilled in the art.

The release coating can be applied in a printing manner similar to any ink coating applied in printing techniques, including the preferred flexographic techniques. This release coating can, thus, be referred to as a printed ink coating that is applied onto the surface of the card over the PIN and radiation/ultraviolet cured by the preferred ultraviolet curing lamp 28, which uses an ultraviolet bulb 28a in an ultraviolet lamp housing 28b.

Figure 2:
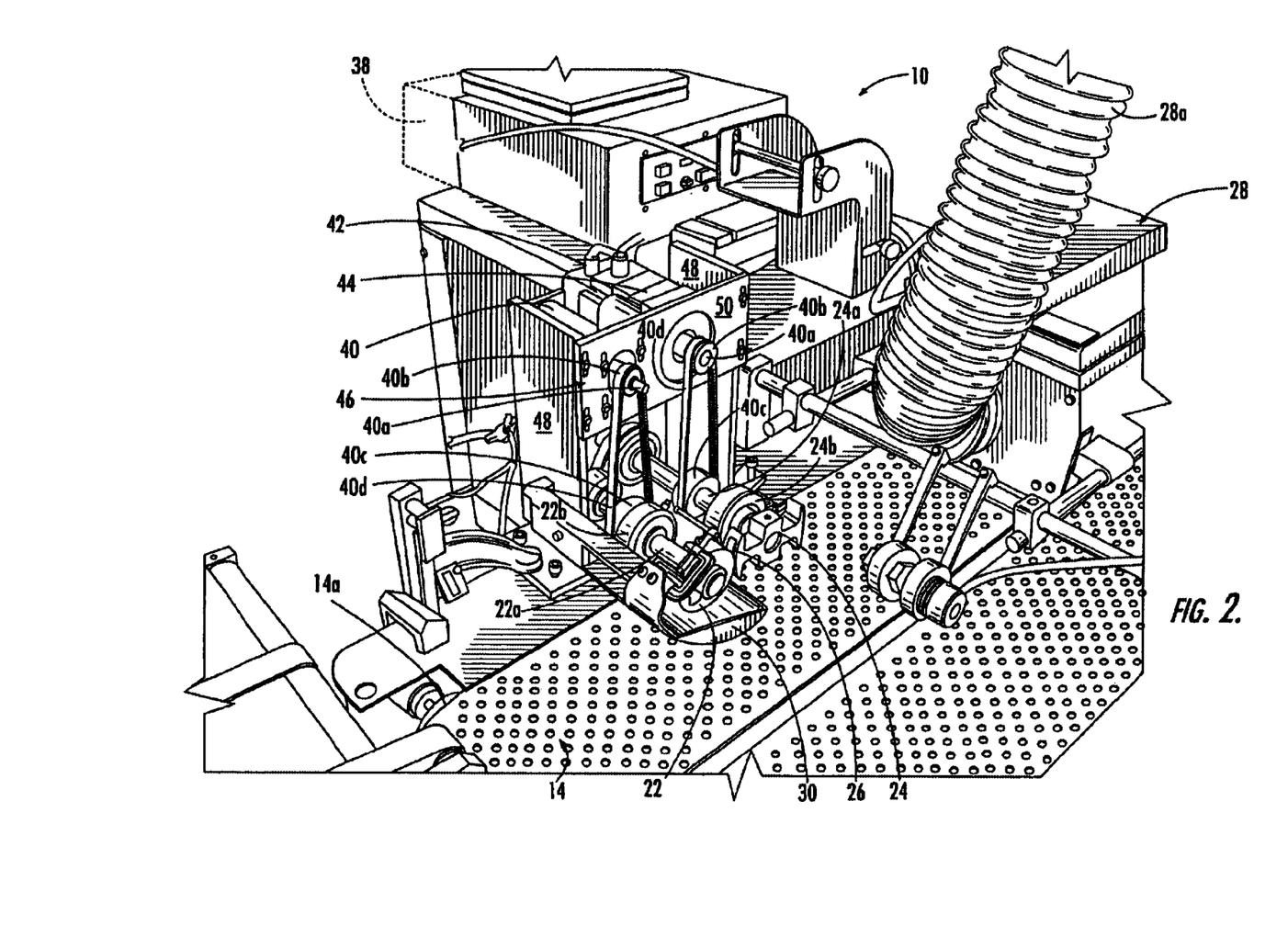
FIG. 2 is an isometric view of a print station used for applying a scratch-off coating (or release coat) onto a planar card member, which is followed by ultraviolet/radiation curing of the scratch-off coating (or release coat).

The belt conveyor 14 typically includes a servodrive in the form of a servomotor 34 operatively connected onto a support shaft 14a of the belt conveyor. An encoder 36 is operatively connected to the shaft 14a and a controller 38. The laser sensor 18 is operative with the conveyor, as shown in FIGS. 1 and 2, and is operatively connected to the controller 38. A DC motor drive 40 is operatively connected to the Anilox metering roll 22, but a more accurate servomotor could be used instead of the DC motor drive, especially with high speed operation. An encoder 42 and servomotor 44 are operatively connected to the plate cylinder 24 to establish precise and controlled movement of the plate cylinder, and thus, controlled movement of the impression plates (print pads) 26 in timed operation with a card moving under the plate cylinder as the card member advances along its predetermined path of travel. In one aspect of the present invention, the servomotor has about 4,000 pulses per revolution of its output shaft to give high accuracy to the system.

Naturally, a release coating is not always necessary depending on the type of substrate used for the card member. The amount of surface tension created by the card surface has an impact on the removability of opaque scratch-off layers, typically formed as a silver ink, as known to those skilled in the art, such that the scratch-off layer could be removed without damaging the PIN even without a release coating, in some instances.

At the second print station 22b, the scratch-off coating is applied after the first print station 22a has printed a release coating in this non-limiting example. As is typical, the scratch-off coating can be a silver ink formed of a material known to those skilled in the art, but could be formed of another type of opaque ink. The print station 22b is similar in design to the first print station 22a and includes the basic printing components as described before, including an Anilox metering roll 22 and plate cylinder 24, the appropriate ink well or reservoir 30, doctor blade 32, DC motor drive 40, servodrive mechanism in the form of a precisely controlled servomotor 44, encoder 42, and impression plates or print pads 26 contained on the plate cylinder. A second ultraviolet curing station (lamp) 28 provides for radiation curing of the printed ink in the form of the opaque scratch-off coating. Although ultraviolet curing is the preferred method of curing as described, it is possible in some cases to use other types of radiation curing, including the possible use of electron beam, blue light, laser or other radiation curing methods known to those skilled in the art.

In one aspect of the present invention, the ultraviolet curing stations 28 used in the present invention are an ultraviolet, modular curing subsystems, such as manufactured and sold by Uvexs of Sunnyville, Calif. Such ultraviolet curing stations include an ultraviolet lamp housing that could use a metal halide, mercury vapor, or other type of ultraviolet lamp known to those skilled in the art with power levels ranging from as low as about 100 watts/inch to as high as about 600 watts/inch. If a release coating is applied, then a mercury vapor lamp could be used. For the opaque scratch-off coating, a metal halide lamp is preferred, but of course, other lamps could be used as suggested by those skilled in the art. The station could have remote operating controls for operator control at a console located a distance from the system, and an adequate power supply for direct ultraviolet exposure (and infrared filter exposure in some cases). The station 28 could also include an internal shutter and a digital exposure timer having a continuous variable power control.

The station 28 could provide surface and in-depth curing for high intensity, full spectrum ultraviolet energy from about 200 to about 400 nanometers. The lamp lengths can vary from as little as 2 to about 80 or more inches and include a single medium pressure mercury vapor, metal halide, or other lamp. Internal cooling fans could be provided with appropriate venting using vent systems 28a as shown in FIG. 2. A reflector could be included in the oven for unfiltered and filtered infrared operation. The shutter could allow exposure control and could be provided by an internally mounted knife blade shutter using a pneumatic cylinder to drive the shutter plate at an adjustable open/close rate. Clean dry air or nitrogen could be used for efficient curing operation. The shutter control could include a pneumatic switch and digital timer for open/close functions. A programmable logic control (PLC) can be used as an interface connector using techniques known to those skilled in the art. Variable power control can provide power control over the ultraviolet lamp.

FIG. 2 illustrates further details of a print station 20a or 20b of the present invention. Only one print station 20b is illustrated for applying a scratch-off coating over the PIN onto a surface of the planar card member without use of a release coating. Naturally, one or more print stations can be used for the present invention, including the three print stations 20a–c as shown in FIG. 1. Although an open ink reservoir is illustrated, as noted before, a chambered doctor blade system is preferred.

As illustrated in FIG. 2, as a non-limiting example, the Anilox metering roll 22 and plate cylinder 24 are each supported on respective support or drive shafts 22a, 24 that are mounted for rotation in respective bearing housings 22b, 24b. The servomotor 44 and DC drive motor 40 are supported by a motor mount 46 (or stand) that includes side support plates 48, a front face plate 50, and a lower support plate (not shown) that supports the motors 44, 40. This motor mount 46 is secured to the conveyor 14 by appropriate fastening and attachment means known to those skilled in the art. A DC drive motor output shaft 40a includes a timing belt pulley 40b that is operatively connected to another timing belt pulley 40c on the Anilox metering roll support shaft via a timing belt 40d.

A timing belt pulley 44b is mounted on the output drive shaft 44a of the servomotor 44 and is operatively connected to another timing belt pulley 44c mounted on the plate cylinder support shaft via a timing belt 44d. These drive mechanisms provide controlled movement of the metering rolls and plate clyinders.

The third print station 20c can be used for personalization and can include a similarly fabricated, flexographic print station as described for the first and second print stations, or could be another type of printing apparatus besides the described flexograph type of printing station. The third print station 20c applies a second coat of ink, scratch-off coating material, or other printed indicia over the first scratch-off coating. Naturally, the print station 20c location would vary if it is used to print a layer over the PIN before application of the scratch-off coating. In one aspect of the present invention, the third print station could be an ink jet print station and apply a fingerprint pattern or similar pattern that is opaque over (or under depending on position of the print station) the scratch-off coating. Also the ink jet printing could apply a security indicia on the opaque scratch-off coating that could be a control code. Thus, if the scratch-off coating and control code were removed, and a scratch-off label applied in its place, then a user would know that tampering of the card has occurred because there would be no control code. Also, the control code could be used for further security and correspond to other control codes printed on the planar card member. During ink jet printing of the second layer, coating, or indicia after the scratch-off coating has been applied, a typical black ink can be provided, although other ink could be provided as known to those skilled in the art.

The controller 38 used for the present invention could be a personal computer or other controller system as known to those skilled in the art. The ink jet PIN print station 16, laser sensors 18, DC motor drives 40, servodrives (motors) 34, 44, encoders 36, 42, shutter controls for the UV station 28, and any other motors and encoders used for the belt conveyor 14 and other components of the system are all operatively connected to the controller.

In operation, the laser sensor 18 senses the leading edge of an advancing card member and registers this edge position to the controller. Throughout the card advancing process, the drive motors and encoder of the conveyor belt drive maintains accurate positional control over the card at all times. The servodrive (motor) 44 that is operatively connected to each of the plate cylinders 24 maintains rotational control to apply the release and scratch-off coatings at a timed moment such that any coatings are applied at a specific location on the surface of a card. In one aspect of the invention, the software system uses a "queue" that is internal to a tracking subroutine within the drive encoder and controller that tracks the product with the belt conveyor. If a gap varies between cards, the system still tracks all cards by placing the known location within the "queue" and knowing the time it takes for sensing a card to the time the card moves into a printing station.

The thickness of the scratch-off coating, release coating, or other coatings can be set not only by the configuration of the knurls in any Anilox metering roll, but also by the type of doctor blade setting used in conjunction with the metering roll. The surface speed of the knurled Anilox metering roll is set to the surface speed of the conveyor belt such that the speeds are synchronized. The speeds of the card relative to the curing time can be varied.

Figure 4:
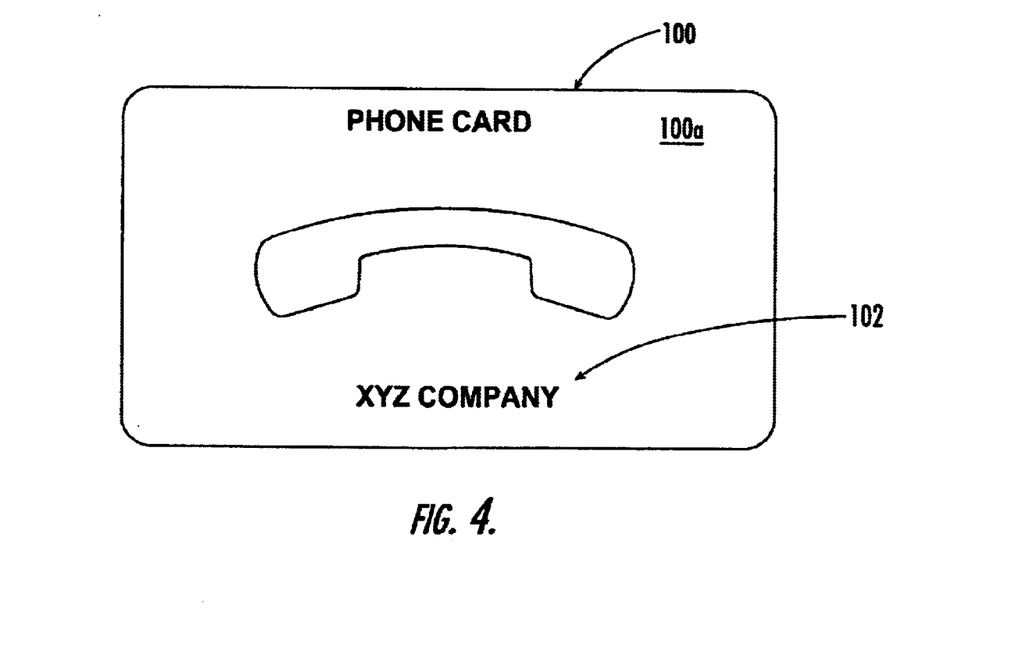
FIGS. 4 and 5 show opposing sides of a debit card of the present invention in the form of a telephone calling card and having the scratch-off coating applied over a PIN.
Figure 5:
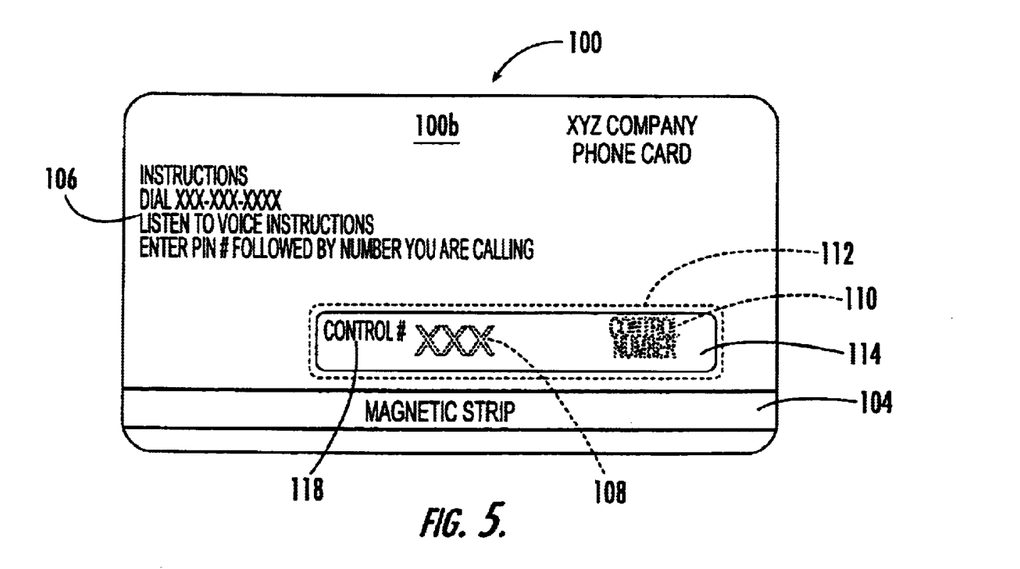
Figure 6:
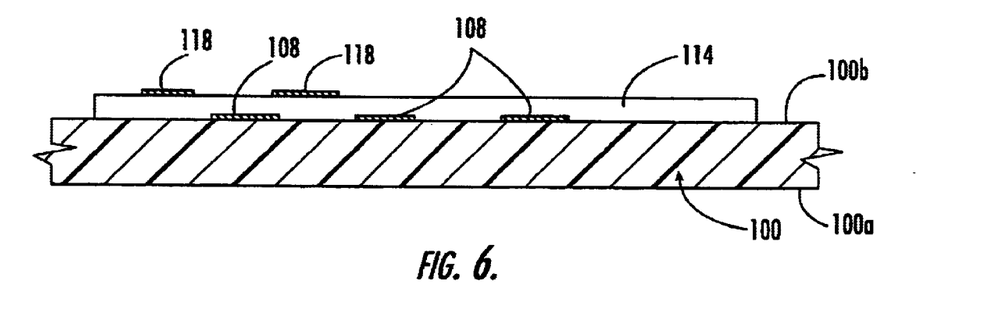
FIG. 6 is an exaggerated sectional view of a first embodiment of a debit card showing a scratch-off coating applied over a PIN.
Figure 7:
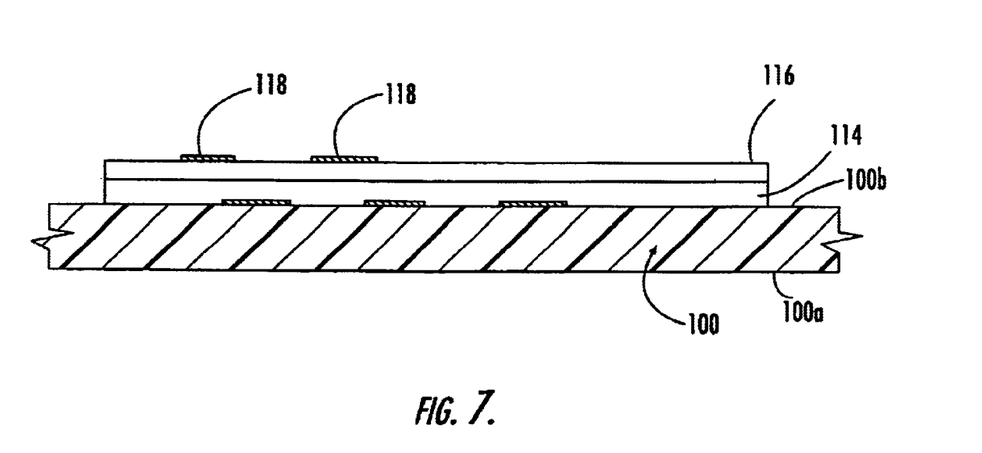
FIG. 7 is an exaggerated sectional view of a second embodiment of a debit card of the present invention showing a printed scratch-off coating and printed second coating applied over a PIN.

FIGS. 4 and 5 illustrate respective front and rear surfaces or faces 100a, 100b of a debit card 100, such as the illustrated phone card. FIG. 4 shows that the phone card 100 includes typical identification information 102 on the front face 100a. The rear surface 100b includes a magnetic strip 104 as is common with some types of phone cards. Instructions 106 for use of the phone card are included on the rear surface 100b. A PIN 108 is printed on the rear surface of the phone card, together with a control number 110 as indicated by the dashed lines for the PIN and control number. A release coating 112 is shown in dashed lines as indicating that a release coating could be applied by a first print station, but does not have to be applied depending on the type of substrate material used for the card member. The scratch-off coating 114 is subsequently applied and shown by the solid line. A second coating 116 can be applied over the scratch-off coating as shown in the section view of FIG. 7 or the scratch-off coating could be the only coating as shown in FIG. 6. A second coating could be a security indicia, fingerprint pattern, or could include a security indicia on top as a control code.

FIG. 5 illustrates that a control number 118 could be used as a security indicia such that if the scratch-off coating is removed, and a scratch-off label applied in its place, the control number would not be shown on the scratch-off label. The second layer on top of the initial scratch-off coating could be a printed black ink as noted before.

The present invention now provides an improved method and debit card that can be processed quickly at up to 30,000 to about 50,000 cards per hour and about 500 to about 800 cards per minute, depending on the type of card, number of print stations, and thickness of any applied layers. No scrap is produced as when a web of scratch-off labels or hot stamp foil are used as in the incorporated by reference patent.

It is also possible that solvent coatings could be used in the present invention. These solvent coatings can be ink with solvents, such as water or other materials, which could be thermal dried. It is also possible to use coatings that are a two-part system that cures similar to epoxy. Other coatings could be used as suggested by those skilled in the art. Also, the card conveying mechanism could be any conveying mechanism suggested by those skilled in the art, including drum, roller or other belt mechanism. A fingerprint pattern could be applied under or over the scratch-off coating as noted before.

Many modifications and other embodiments of the invention will come to the mind of one skilled in the art having That which is claimed is:

1. A method of forming a debit card comprising the steps of:
    advancing a planar card member along a predetermined path of travel, the card member having opposing surfaces and a PIN printed on one of the surfaces;
    printing by a flexographic printing process an opaque scratch-off coating onto the surface having the PIN such that the PIN is covered by the printed scratch-off coating; and
    radiation curing the scratch-off coating.

2. A method according to claim 1, and further comprising the step of printing by the flexographic printing process the scratch-off coating by metering a scratch-off material from an anilox metering roll onto an impression plate, and transferring the scratch-off material from the impression plate onto the surface of the planar card member.

3. A method according to claim 1, wherein the step of printing an opaque scratch-off coating further comprises the steps of printing a substantially opaque ink layer and printing an ink layer either under or over the opaque scratch-off coating ink layer.

4. A method according to claim 3, wherein the step of printing the substantially opaque printed ink layer comprises the step of printing an ultraviolet curable ink layer that is opaque after curing.

5. A method according to claim 1, and further comprising the step of ink jet printing over the opaque scratch-off coating.

6. A method according to claim 1, and further comprising the step of applying a security indicia on the opaque scratch-off coating.

7. A method according to claim 6, wherein the security indicia comprises a control code.

8. A method according to claim 1, wherein the planar card member comprises a substantially rigid plastic substrate.

9. A method according to claim 1, wherein the planar card member is substantially rectangular configured and wallet sized.

10. A method according to claim 1, and further comprising the step of printing by a flexographic printing process a release coating over the PIN before printing the opaque scratch-off coating to enhance removal of the scratch-off coating without damaging the PIN.

11. A method of forming a debit card comprising the steps of:
    advancing a planar card member along a predetermined path of travel, the card member having a opposing surfaces and a PIN printed on one of the surfaces;
    printing by a flexographic printing process a release coating onto the surface of the planar card member over the PIN;
    printing by a flexographic printing process an opaque scratch-off coating onto the release coating such that the PIN is covered by the opaque scratch-off coating; and
    radiation curing the scratch-off coating by ultraviolet radiation.

12. A method according to claim 11, and further comprising the step of printing an ultraviolet curable release coating and after printing, curing the release coating by ultraviolet radiation.

13. A method according to claim 11, wherein the release coating is substantially transparent.

14. A method according to claim 11, wherein the step of printing an opaque scratch-off coating further comprises the step of printing a first, substantially opaque scratch-off coating.

15. A method according to claim 11, and further comprising the step of printing the scratch-off coating by the flexographic printing process by metering a scratch-off material from an anilox metering roll onto an impression plate, and transferring the scratch-off material from the impression plate onto the surface of the planar card member.

16. A method according to claim 11, wherein the step of printing an opaque scratch-off coating further comprises the steps of printing a substantially opaque ink layer and printing an ink layer either under or over the opaque scratch-off coating layer.

17. A method according to claim 16, wherein the step of printing a substantially opaque printed ink layer comprises the step of printing an ultraviolet curable ink that is opaque after curing.

18. A method according to claim 11, and further comprising the step of ink jet printing over the opaque scratch-off coating.

19. A method according to claim 11, and further comprising the step of applying a security indicia on the opaque scratch-off coating.

20. A method according to claim 19, wherein the security indicia comprises a control code.

21. A method according to claim 11, wherein the planar card member comprises a substantially rigid plastic substrate.

22. A method according to claim 11, wherein the planar card member is substantially rectangular configured and wallet sized.

23. A debit card comprising:
    a planar card member having opposing surfaces;
    a PIN applied onto a surface of the planar card member; and
    an opaque scratch-off coating formed from a radiation cured medium and printed by a flexographic printing process over the PIN to hide the PIN from view and such that upon removal, the PIN is exposed to view for use of the debit card.

24. A debit card according to claim 23, wherein said debit card comprises a telephone calling card.

25. A debit card according to claim 23, wherein said debit card comprises a credit card.

26. A debit card according to claim 23, wherein said opaque scratch-off coating comprises a substantially opaque printed ink layer and a printed ink layer either under or over the substantially opaque printed ink layer.

27. A debit card according to claim 26, wherein said opaque printed ink layer comprises an ultraviolet cured ink that is opaque after ultraviolet curing.

28. A debit card according to claim 27, wherein said ink layer under or over the opaque ink layer comprises a second substantially opaque printed ink layer.

29. A debit card according to claim 23, and further comprising a printed ink layer over the opaque scratch-off coating.

30. A debit card according to claim 23, and further comprising a security indicia applied on the opaque scratch-off coating.

31. A debit card according to claim 30, wherein said security indicia comprises a control code.

32. A debit card according to claim 23, wherein said planar card member comprises a substantially rigid plastic substrate.

33. A debit card according to claim 23, wherein said planar card member is substantially rectangular configured and wallet sized.

34. A debit card according to claim 33, and further comprising a release coating interposed between said PIN and opaque scratch-off coating and printed by a flexographic printing process for enhancing scratch-off of the scratch-off coating without damaging the PIN.

35. A debit card comprising:

a planar card member having opposing surfaces;

a PIN printed onto a surface of the planar card member;

a release coating printed by a flexographic printing process onto the planar card member over the PIN; and an ultraviolet cured opaque scratch-off coating printed by a flexographic printing process onto the release coating and covering the PIN to hide the PIN from view, wherein removal of the opaque scratch-off coating is facilitated by said release coating to protect the PIN from damage such that after removal of the scratch-off coating, the PIN is exposed to view for use of the debit card.

36. A debit card according to claim 35, wherein said release coating comprises an ultraviolet cured coating.

37. A debit card according to claim 35, wherein said release coating is substantially transparent.

38. A debit card according to claim 35, wherein said debit card comprises a telephone calling card.

39. A debit card according to claim 35, wherein said debit card comprises a credit card.

40. A debit card according to claim 35, wherein said opaque scratch-off coating comprises a substantially opaque printed ink layer and a printed ink layer either under-or over the opaque scratch-off coating.

41. A debit card according to claim 40, wherein said ink layer comprises and ultraviolet cured ink that is substantially opaque after ultraviolet curing.

42. A debit card according to claim 40, wherein said ink layer under or over the opaque ink layer comprises a substantially opaque printed ink layer.

43. A debit card according to claim 40, wherein said printed ink layer comprises an ink jet printed layer.

44. A debit card according to claim 35, and further comprising a security indicia applied on the opaque scratch-off coating.

45. A debit card according to claim 44, wherein said security indicia comprises a control code.

46. A debit card according to claim 35, wherein said planar card member comprises a plastic substrate.

47. A debit card according to claim 35, wherein said planar card member is substantially rectangular configured and wallet sized.

48. A system for forming a debit card comprising:

a conveying mechanism for sequentially advancing planar card members along a predetermined path of travel, each card having a PIN on one of the surfaces;

a flexographic printing station positioned along the predetermined path of travel for printing by a flexographic printing process an opaque scratch-off coating onto the surface of the card having the PIN such that the PIN is covered by the printed scratch-off coating; and a radiation curing station located along the path of travel for radiation curing the scratch-off coating.

49. A system according to claim 48, wherein said flexographic printing station comprises an ink bath for holding scratch-off coating material, an anilox metering roll that engages the ink bath, and a plate cylinder that engages the anilox metering roll and transfers the scratch-off coating onto the card.

50. A system according to claim 45, wherein said plate cylinder comprises print pads for transferring the scratch-off coating material onto the card.

51. A system according to claim 48, and further comprising a flexographic printing station positioned along the predetermined path of travel for applying a release coating onto the surface of the planar card member before applying the scratch-off coating.

52. A system according to claim 51, wherein said flexographic printing station that applies a release coating comprises a bath for holding release coating material, an anilox metering roll that engages the bath, and a plate cylinder that engages the anilox metering roll and transfers the scratch-off coating onto the card.

53. A system according to claim 48, and further comprising a controller operative with the conveying mechanism and the flexographic printing station for controlling the advance of planar card members in timed sequence with the flexographic printing occurring at the flexographic printing station.

54. A system according to claim 48, wherein said radiation curing station comprises an ultraviolet radiation curing station.

55. A system according to claim 54, and further comprising a printing station for printing station for printing a security indicia on the opaque scratch-off coating.

* * * * *

UNITED STATES PATENT AND TRADEMARK OFFICE
CERTIFICATE OF CORRECTION

PATENT NO. : 6,729,656 B2
DATED : May 4, 2004
INVENTOR(S) : Kubert et al.

It is certified that error appears in the above-identified patent and that said Letters Patent is hereby corrected as shown below:

Column 11,
Line 4, delete "A debit card according to claim 33" substitute -- A debit card according to claim 23 --

Column 12,
Line 22, delete "A system according to claim 45" substitute -- A system according to claim 49 --

Signed and Sealed this

Third Day of August, 2004

JON W. DUDAS
*Acting Director of the United States Patent and Trademark Office*